W. P. MILLER,
Assignor to R. HOE & Co.
Saw.
No. 8,534. Reissued Jan. 7, 1879.
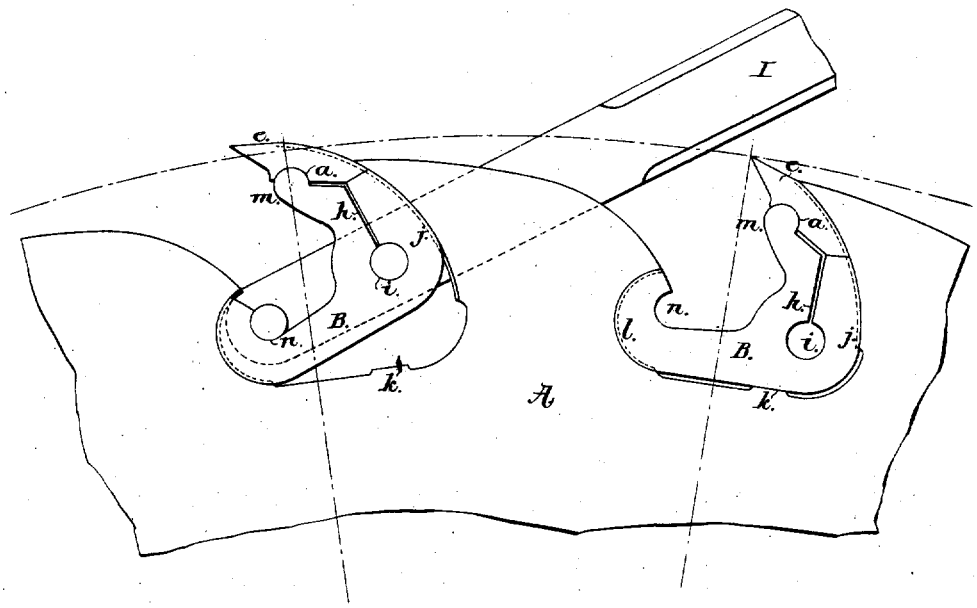
Attest,
Geo. H. Graham
Alexander Scott
Inventor
Warren P. Miller,
by Munson & Philipp
Attorneys.
N. PETERS, PHOTO-LITHOGRAPHER, WASHINGTON, D. C.

UNITED STATES PATENT OFFICE.

WARREN P. MILLER, OF NEW YORK, N. Y., ASSIGNOR TO R. HOE & CO., OF SAME PLACE.

IMPROVEMENT IN SAWS.

Specification forming part of Letters Patent No. 168,338, dated October 5, 1875; Reissue No. 8,534, dated January 7, 1879; application filed June 1, 1878.

*To all whom it may concern:*

Be it known that I, WARREN P. MILLER, formerly residing in the city, county, and State of New York, now residing in the city of Brooklyn, county of Kings, and State of New York, have invented certain new and useful Improvements in Saws; and I do hereby declare the following to be a full, clear, and exact description of the construction and operation of the same, reference being had to the accompanying drawing, forming a part of this specification, in which the figure shows a section of a saw-plate with two cutting-teeth, their sockets and shanks, and the wrench for moving said shanks shown as applied to the opposite side of the plate.

The object of my invention is to produce cutting teeth or bits, sockets to receive them, and means for carrying and holding said cutting teeth or bits in said sockets; and it consists, first, of the combination of a cutting tooth or bit with a shank engaging therewith to carry said tooth or bit into its socket and retain it there; secondly, a shank for saws, having a jaw, the end of which enters a depression in the face of a cutting tooth or bit to carry the latter into its socket and retain it there; thirdly, the combination of a cutting tooth or bit, provided with a transverse depression in its face, with a socket to receive said tooth or bit, and a shank having a jaw, the end of which carries said tooth or bit into said socket and retains it there; fourthly, a saw provided with sockets composed of segments of unequal circles, with a base joining them, for the reception of cutting teeth or bits and shanks; fifthly, a shank pierced and slotted, in combination with a cutting-bit and a saw-plate provided with a socket for the reception of the shank or bit.

To enable others skilled in the art to make and use my invention, I will proceed to describe its construction and operation, referring to the drawings and letters of reference thereon.

A is a section of a saw-plate, provided with sockets composed of two segments of unequal circles, so located that a straight base may be formed between them, and capable of receiving a shank to readily attach cutting teeth or bits thereto. (Shown in the figure of the drawing.)

The inner edges of these segments are provided with V-shaped projections. The base formed between the segments is cut a little lower than the bottom line of the shank, so that a projection, *k*, will be the only point of contact with the bottom of the shank.

*e* are the cutting teeth or bits, struck up in steel dies from hot steel rods to the proper form, each provided with a groove in its back to fit the V-shaped projection on the inner edge of one of the segments of the socket, and with a transverse depression, *a*, in its face, for a purpose to be explained. The bits are then tempered and ground to a cutting-edge.

B are movable shanks, punched from sheet-steel, each provided with a toe, *l*, and heel *j*, forming segments, in the outer edges of which V-shaped grooves are cut so as to fit the V-shaped projections on the inner edges of the segments of the socket, as shown in the figure of the drawing. Each shank is pierced at *i* and slotted at *h*, has a half-circle, *n*, cut in its toe, and is provided with a jaw, *m*, the end of which enters the transverse depression *a* in the face of the cutting tooth or bit *e*, to carry the latter into its socket when the shank is turned into the position shown at the right of the figure of the drawing and retain it there. The shanks, after being made as described, are given a spring-temper.

The object of slotting the shank at *h* is to render the jaw *m* elastic, that it may conform to the teeth, though they may be of different thicknesses. At the same time the heel *j* is left independent, and will maintain its position against the saw-plate. The end of the cutting tooth or bit *e* rests on the heel of the shank, which prevents its tripping when resistance is applied to the edge of the tooth.

T is a wrench, having two pins projecting from its side, so located that they conform to the half-circle *n* and the hole *i*, and may readily be applied to the shank B, by which it can be easily turned.

When the shank is in the position shown in the left-hand portion of the drawing, the tooth or bit may be removed and another put in its place.

Sockets are formed all around the periphery of the saw-plate, provided with shanks and cutting teeth or bits, as described.

What I claim as my invention, and desire to secure by Letters Patent, is—

1. The combination of a cutting tooth or bit with a shank, constructed substantially as described, to engage therewith and carry said tooth or bit into its socket and retain it there.

2. A shank for saws having a jaw, the end of which enters a transverse depression in the face of a cutting tooth or bit, to carry the latter into its socket and retain it there, substantially as shown and described.

3. The combination of a cutting tooth or bit, provided with a transverse depression in its face, with a socket to receive said tooth or bit, and a shank having a jaw, the end of which enters said depression and carries said tooth into said socket and retains it there, substantially as shown and described.

4. A saw provided with sockets composed of two segments of unequal circles and a base joining them, for the reception of cutting teeth or bits and shanks, substantially as shown and described.

5. A shank pierced at *i* and slotted at *h*, in combination with the cutting-bit *e* and saw-plate A, the latter being provided with a socket for the reception of the shank and bit, substantially as shown, and for the purpose specified.

In testimony whereof I have signed my name to this specification in the presence of two subscribing witnesses.

WARREN P. MILLER.

Witnesses:

H. T. MUNSON,

GEO. H. GRAHAM.